JOSEPH LORY, OF MEMPHIS, TENNESSEE.

Letters Patent No. 88,793, dated April 13, 1869.

IMPROVED HAIR-DYE.

The Schedule referred to in these Letters Patent and making part of the same.

*To all whom it may concern:*

Be it known that I, JOSEPH LORY, of the city of Memphis, in the county of Shelby, and State of Tennessee, have invented or discovered a new and useful Chemical Compound; and I do hereby declare that the following is a full, clear, and exact description thereof.

The nature of my invention consists in producing a clean, harmless hair and whisker-dye, that does not discolor the skin, and can be applied at the pleasure of the person using it, with a common tooth-brush, producing any color desired, by the frequency of its use.

To enable others skilled in the art to make and use my invention, I will proceed to describe its compounding.

To make eight ounces Hyperion Fluid, take twelve ounces distilled water; eighty grains nitrate of silver; one drachm liquor ammoniæ; and one ounce lac-sulphur.

To manufacture it, I mix one ounce lac-sulphur with twelve ounces distilled water, boil it one hour, or till it is reduced to seven ounces, then strain or filter thoroughly, dissolve eighty grains nitrate of silver in one ounce distilled water, then add the one drachm liquor ammoniæ. The effect will be to render the mixture perfectly clear, then mix all together and refilter when it is ready for use.

What I claim as my invention, and desire to secure by Letters Patent, is—

The compound and mode of preparing, for dyeing hair, as herein described, using for that purpose the aforesaid chemical compound and mode of preparing, as described above for the purposes as are herein set forth.

JOSEPH LORY.

Witnesses:
PETER LORY,
WM. EHLE.